United States Patent
Humele et al.

(10) Patent No.: US 8,404,175 B2
(45) Date of Patent: Mar. 26, 2013

(54) METHOD AND DEVICE FOR THE PRODUCTION OF PLASTIC PACKAGING CONTAINERS

(75) Inventors: Heinz Humele, Thalmassing (DE); Franz Gmeiner, Sinzing Ortsteil Eilsbrunn (DE); Volker Kronseder, Neutraubling (DE)

(73) Assignee: Krones AG, Neutraubling (DE)

(*) Notice: Subject to any disclaimer, the term of this patent is extended or adjusted under 35 U.S.C. 154(b) by 95 days.

(21) Appl. No.: 12/439,980

(22) PCT Filed: Sep. 11, 2007

(86) PCT No.: PCT/EP2007/007900
§ 371 (c)(1),
(2), (4) Date: Aug. 4, 2009

(87) PCT Pub. No.: WO2008/031558
PCT Pub. Date: Mar. 20, 2008

(65) Prior Publication Data
US 2010/0019414 A1 Jan. 28, 2010

(30) Foreign Application Priority Data
Sep. 12, 2006 (DE) .......................... 10 2006 042 711

(51) Int. Cl.
*B29C 49/72* (2006.01)
*H05B 6/00* (2006.01)
(52) U.S. Cl. ........ 264/482; 264/161; 264/138; 264/536; 264/454

(58) Field of Classification Search ..................... None
See application file for complete search history.

(56) References Cited

U.S. PATENT DOCUMENTS

| | | | | |
|---|---|---|---|---|
| 1,157,660 | A * | 10/1915 | Coates | ............ 156/483 |
| 3,279,599 | A * | 10/1966 | Drennan | ............ 209/531 |
| 3,417,428 | A | 12/1968 | Rupert | |
| 3,675,521 | A | 7/1972 | Ziegler | |
| 3,818,785 | A * | 6/1974 | Wakabayashi | ............ 82/101 |
| 3,888,617 | A | 6/1975 | Barnett | |
| 4,271,103 | A | 6/1981 | McAlister | |
| 4,549,066 | A | 10/1985 | Piccioli et al. | |
| 6,814,923 | B2 * | 11/2004 | Bromley et al. | ............ 264/536 |
| 2003/0124374 | A1 | 7/2003 | Bromley et al. | |

FOREIGN PATENT DOCUMENTS

| | | |
|---|---|---|
| DE | 1802877 | 9/1970 |
| DE | 3938029 | 8/1990 |
| DE | 10351249 | 6/2005 |
| EP | 0154397 | 9/1985 |
| EP | 0513501 | 11/1992 |
| EP | 1050394 | 8/2000 |
| ES | 2253110 | 5/2006 |

(Continued)

OTHER PUBLICATIONS

International Search Report for PCT/EP2007/007900, Sep. 11, 2007.

*Primary Examiner* — Monica Huson
(74) *Attorney, Agent, or Firm* — Marshall, Gerstein & Borun LLP

(57) ABSTRACT

A method and a device for the manufacture of plastic packagings, the same being manufactured by stretch blowing a bottle-like preliminary packaging which is, after completion, treated by means of a laser and thus reshaped to the final packaging. Also, a plastic container manufactured according to this method and with this device.

36 Claims, 6 Drawing Sheets

FOREIGN PATENT DOCUMENTS

| JP | 62118991 | 5/1987 |
| WO | WO-2005097465 | 0/2005 |
| WO | WO-2004/009331 | 1/2004 |
| WO | WO-2006056673 | 1/2006 |

* cited by examiner

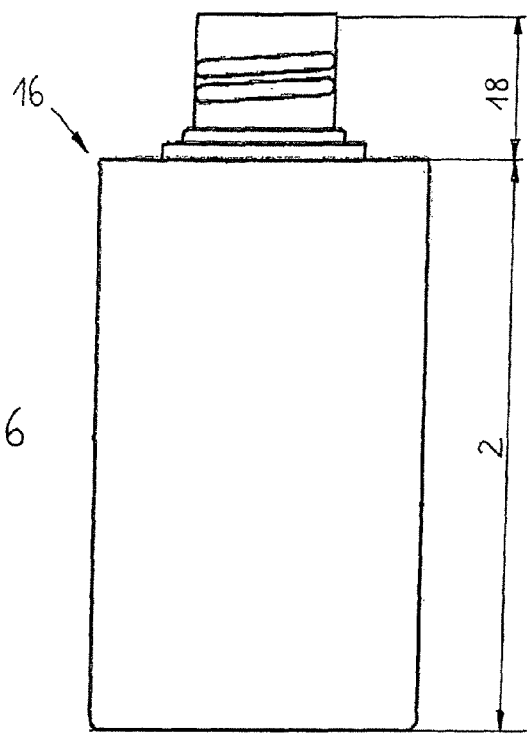
FIG. 6
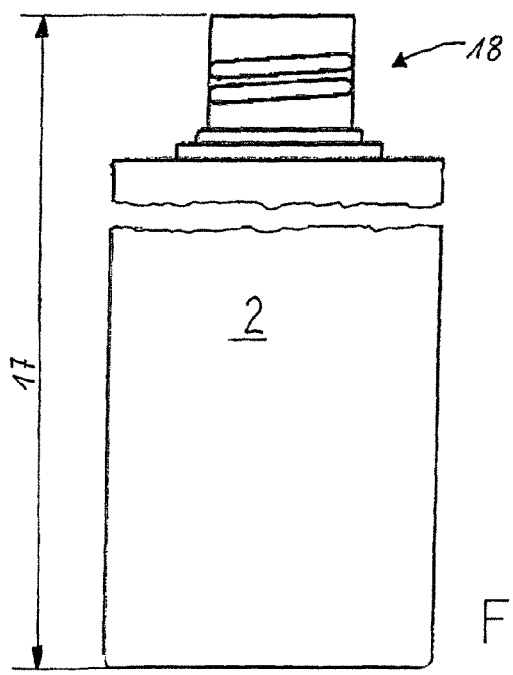
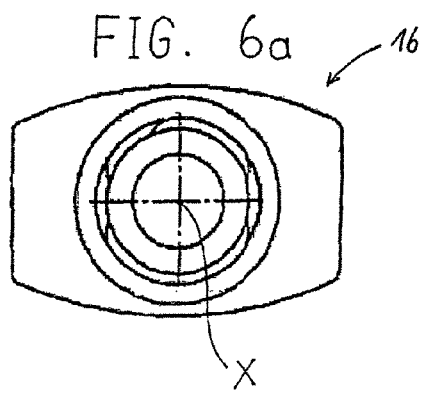
FIG. 6a
FIG. 6b ated herein by reference in its entirety.
METHOD AND DEVICE FOR THE PRODUCTION OF PLASTIC PACKAGING CONTAINERS The present application claims the benefit of priority of International Patent Application No. PCT/EP2007/007900, filed Sep. 11, 2007 which application claims priority of German Patent Application No. 10 2006 037 683.8, filed Aug. 11, 2006. The entire text of the priority application is incorporated herein by reference in its entirety.

FIELD OF THE DISCLOSURE

The disclosure relates to a method for the manufacture of plastic packagings, a device for the manufacture of plastic packagings, as well as a plastic packaging, such as employed in food industry, in particular in the packaging of food, e.g., solid food, such as pralines. The plastic packaging is formed from a bottle-like intermediate prepared in a stretch blowing machine, the upper part of the intermediate being cut off.

BACKGROUND

According to the prior art, such methods are already being employed for manufacturing plastic containers. U.S. Pat. No. 3,675,521 e.g. shows a device in which bottles comprising a double neck shoulder are cut by means of a knife underneath the neck shoulder such that a wide-mouth bottle for beverages is formed.

WO 2004/009331 A1 also describes a method and a device for the manufacture of a wide-mouth plastic bottle, where first a plastic bottle with a narrow neck and a thread impressed in the central area is formed by means of a stretch blow process. The final wide-mouth container is formed by cutting the intermediate by means of knives above the impressed thread, so that the upper mouth or neck region of the intermediate is omitted.

ES 2253110 also shows a method for the manufacture of a wide-mouth plastic bottle, here, too, first an intermediate being formed by stretch blowing. This intermediate is cut by means of a knife movable along the longitudinal axis of the container at an impressed shoulder.

It is common to all three mentioned prior art methods that the cutting operation is carried out by means of a knife, so that only containers of a certain wall thickness can be handled. If the wall of the containers becomes too thin, a faultless performance of this method is no longer possible as the container formed is too instable to resist such a mechanical intrusion as that of the knives. Another problem with this prior art is that wear of the cutting knife has to be expected, so that on the one hand the quality of the packaging containers formed decreases as the period of application of the knives increases, on the other hand the cutting knives have to be replaced relatively often. A further disadvantage of the known methods is that the mechanical cutting operation by means of the knives cannot be arbitrarily extended with respect to the cutting speed.

SUMMARY OF THE DISCLOSURE

It is therefore the object of the present disclosure to provide a method and a device for the manufacture of plastic packaging containers offering on the one hand an increased output and comprising on the other hand less susceptible to wear and being able to also manufacture thin-walled packaging containers.

In the course of the manufacture of plastic packagings by means of the method, a bottle-like preliminary packaging is prepared from a preform, preferably consisting of plastics, such as e.g. PET, by a blowing operation, in particular a stretching operation. The advantage of the manufacture of the preliminary packaging by means of a stretch blow operation is that very inexpensive high-quality packaging containers are formed. This preliminary packaging is subsequently treated with a cutting module so that the upper part of the packaging is separated from the preliminary packaging. Thereby, the neck region with the relatively narrow mouth formed by stretch blowing is removed, and a packaging container having a wide neck or a packaging container having an upper opening essentially corresponding to the diameter of the container is formed.

Preferably, several preliminary packagings are treated simultaneously with one cutting unit each, so that an increase in the performance of the machine is realized. The use of a laser as cutting unit has the advantage of an increased performance with a very good and constant quality of the cutting mark.

The term cutting unit is to be understood such that it is not absolutely necessary to have a separate laser for each container to be cut. One can also think of solutions where there is a central laser, the laser beam of which is divided and distributed to the individual cutting units. One cutting unit can, for example, be designed as a lens that manipulates the laser beam in such a manner that a defined focal point is generated. A cutting unit, however, can also be a mirror by which the laser beam is deflected. It is possible for the cutting unit to be formed by a commercially available laser scanner that is able to deflect the laser beam very quickly in a predetermined range (e.g. at a speed of 10 m/s). In this manner, a very simple unit is formed which works very quickly, efficiently and cheaply.

Another aspect that increases the performance consists in the laser cutting units moving along the conveyor track of the preliminary packagings during the cutting operation. The advantage of this method is that the time of interaction of the individual preliminary packagings with the laser cutting unit associated to them along the conveyor track is sufficient despite the high transport speed. This interaction between laser cutting unit and preliminary packaging during the cutting operation is best if there is no relative motion between the laser cutting units and the preliminary packagings with respect to the direction of transport.

Preferably, the laser cutting unit and the preliminary packaging are arranged with respect to each other such that the laser beam is arranged perpendicularly to the longitudinal axis of the preliminary packaging. However, it is also possible for the laser beam to comprise an angle of more or less than 90° to the longitudinal axis of the containers. Thereby, it is e.g. possible to cut undercuts of preliminary packagings without affecting the areas situated in front of them.

A preferred further development of the disclosure consists in the preliminary packagings rotating about their longitudinal axes during the cutting operation. This embodiment has the advantage that the cutting point, that means the focal point of the laser, is at a fixed place and the container moves to thus move the current region to be cut into the focal point. This procedure is mainly advantageous with bottles having a circular cross-section in the cutting region. If shaped bottles, such as bottles with an essentially noncircular cross-section in the cutting region, are cut, during the rotation of the container about its longitudinal axis, the focal point of the laser has to be adjusted, or the distances between the laser cutting unit and the preliminary packaging have to be changed to be able to carry out the respective desired cut at the desired point. The change of the distance between the laser cutting unit and the preliminary packaging can be performed either by moving the preliminary packaging or by moving the laser cutting unit.

However, it is also possible to neither change the distance of the preliminary packaging and the laser cutting unit during cutting, nor to rotate the preliminary packaging about its own axis. Successful cutting off of the upper part of the preliminary packaging can also be performed if, with a simultaneous swinging movement of the laser from one side to the other side of the preliminary packaging, so that as the focal point of the laser travels along the contour of the preliminary packaging to be cut, its focal length is adapted.

An advantageous method consists in the preliminary packagings being located on an essentially circular conveyor track during the cutting operation. The laser cutting units can then be either arranged stationarily or also move along with the preliminary packagings. One embodiment of the disclosure consists in the number of the laser cutting units being equal to the number of the treatment stations situated on the circular conveyor track, such as dial feeds. Thereby, one laser cutting unit is permanently associated to each preliminary packaging to be cut. In this manner, an extremely high throughput and thus an extremely high performance with respect to the output of the plastic packagings are possible.

One embodiment of the disclosure consists in the preliminary packagings being combined to groups during the cutting operation, the groups moving together along the conveyor track and being also cut together in the cutting module. The advantage of this group-wise arrangement is that it is not necessary to provide one laser cutting unit for each packaging situated in the cutting module, so that the costs of the cutting module can in this case be essentially reduced.

A further development of the disclosure consists in the speed of the groups of preliminary packagings along the conveyor track being zero at the time of the cutting operation. The advantage of this procedure is that no disturbing factors, such as a free motion of the treatment stations during the revolution, occur during the cutting operation.

However, it is also possible for the preliminary packagings to move on an essentially linear conveyor track during the cutting operation. For example, a linear transport can be accomplished e.g. by means of a chain to which gripping units are attached. An advantageous further development of the disclosure provides for the laser cutting units to move in the direction of transport of the preliminary packagings, so that no relative motion between the preliminary packagings and the laser cutting units takes place during the cutting operation. The advantage of this arrangement is that a very precise separation of the upper part of the packaging from the plastic packaging can be performed. Upon completion of the cutting operation, the laser cutting units move into the direction opposite to the direction of transport back to the starting position of the cutting operation. Thereby, the laser cutting units follow a closed path leading from the starting position of the cutting operation via the end position of the same and the home position of the laser cutting units to the starting position.

According to a preferred further development of the disclosure, subsequently to the completion of the stretch-blown container and before the removal of the upper part of the packaging, a treatment process takes place. This can be e.g. labeling, marking, a cleaning process or the like. The advantage of this procedure is that the container can be handled more easily before the upper part of the packaging is removed, in particular if the packagings have very thin walls.

Easier handling of the containers e.g. means that it is easily possible to fix the packaging at the still existing neck portion, for example by neck clips, internal neck grippers or the like. Moreover, an internal pressure can be applied mainly to thin-walled plastic packagings during labeling, so that the fitting process with a reinforced wall can be performed very exactly.

One further development of the disclosure consists in an exhaust system being attached in the region of the cutting module which removes vapors formed by the cutting operation.

A preferred embodiment of the method consists in a preliminary packaging being treated in a treatment unit before the cutting in a cutting module but after the manufacture in a blowing machine. The treatment unit can be a labeling machine, an inscription machine, a cleaning machine or the like.

The following advantages according to the disclosure result with respect to the device.

According to a preferred further development of the disclosure, the laser cutting units are fixed to a common support, so that there is an exact association or a fixed division of the individual laser cutting units. This is mainly advantageous if the support moves at least partially along the conveyor track of the preliminary packagings, as then only one support has to be driven which then in the same manner moves all laser cutting units.

A particularly preferred device consists in a treatment unit, such as a labeling module, a marking module or a cleaning module, being located between the blowing machine and the cutting module. Thereby, the advantages of handling bottle-like containers can be utilized. The preliminary packaging can be clamped from above and from the bottom e.g. during the labeling procedure.

Another preferred further development of the disclosure consists in the preliminary packagings being combined to groups, where in the cutting module as many laser cutting units are present as preliminary packagings can be received in one group. The arrangement in groups preferably takes place in workpiece holders or group holders that can be formed e.g. by grippers or workpiece holders applied to the bottom. Another embodiment of the disclosure provides for the number of laser cutting units to be equal to the number of treatment stations in the cutting module. This arrangement is particularly advantageous if the preliminary packagings move in a circuit in the cutting module. Thereby one laser cutting unit is permanently associated to each treatment station, so that during the movement of the preliminary packaging along the conveyor track, there is no relative motion between the laser cutting units and the preliminary packagings in the direction of transport. Furthermore, one preferred further development of the disclosure consists in a unit generating the laser beam being present, where the laser beam is split up to the various laser cutting units. Such a splitting up can be accomplished e.g. by mirrors or by optical conductors.

For carrying out the method, a $CO_2$ laser is preferably used as the same can provide the corresponding power in the focal point. Other laser types are also possible; however, the respective periphery or the respective efficiency of the laser has to be adapted to the products to be processed.

According to a preferred further development of the disclosure, the cutting module comprises grippers which can hold the preliminary packagings. Grippers can be e.g. bottom, body or neck grippers which grip the preliminary packagings at or in the corresponding regions. As neck grippers, e.g. common neck handling clamps or inner mouth grippers can be used, as bottom grippers, e.g. commercially available workpiece holders adapted to the preliminary packagings are possible.

However, it is also possible for the transport in the cutting module to be accomplished by means of chains.

Another advantageous embodiment of the disclosure consists in the preliminary packagings being treated in a treatment unit after they have exited a blowing machine and before they are treated in a cutting module. Such a treatment unit can be e.g. a labeling module, a marking or printing module or a cleaning module. Other treatment processes are absolutely possible.

BRIEF DESCRIPTION OF THE DRAWINGS

A concrete embodiment of the disclosure will be illustrated with reference to the following drawings.

In the drawings:

FIG. 6 shows representations of a plastic packaging.

DETAILED DESCRIPTION OF THE PREFERRED EMBODIMENT

Figure 1:
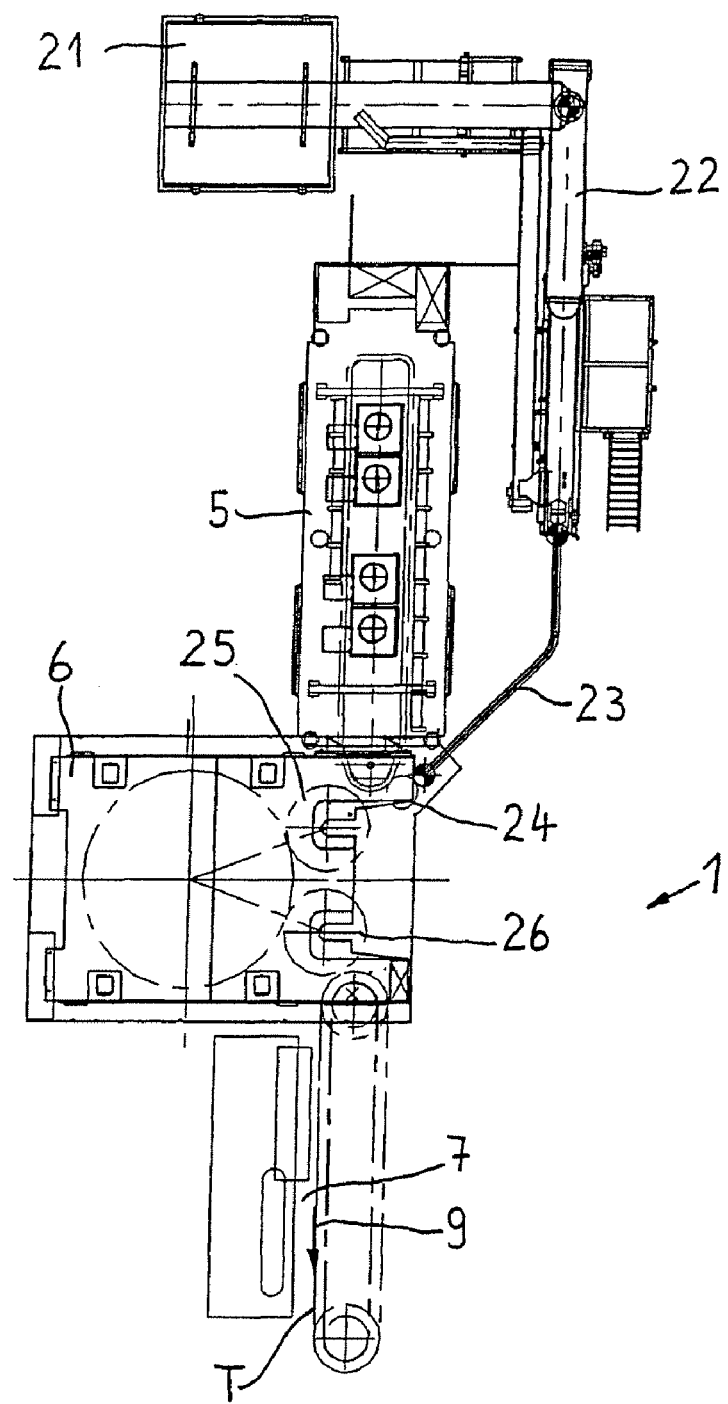
FIG. 1 shows a plan view of a part of a system according to the disclosure.

FIG. 1 shows a part of a machine arrangement for manufacturing plastic packagings 2. The arrangement shows a preform storage 21 which stores plastic preforms as bulk material. From there, they are transported to a preform orientation 22 where they are sorted and oriented for their further processing before they are forwarded towards the heater 5 via the preform supply 23. At the entrance of this heater 5, there is a saw tooth star 24 which controls the controlled supply.

In the heater 5, the preforms are brought to an orientation temperature, the heating being accomplished by means of infrared radiators. During the transfer of the preforms 25 from the heater 5 to the blowing machine 6 via the feeding star 25, the preforms have a desired temperature distribution across their complete circumference and their complete height.

The preforms are shaped in the blowing machine 6 by means of high-pressure blast air to form plastic bottles, the preliminary packagings 16. The shaping procedure is here supported by a stretching rod that stretches the preforms in the axial direction. The preliminary packagings 16 manufactured in this manner are handed over from the blowing machine 6 to the cutting module 7 by means of the outlet star 26. There, the mouth regions of the plastic bottles are separated from the bottom and body regions, a wide-mouth plastic packaging being formed. The further treatment—that means the transport of the plastic packaging 2 and the upper parts of the packaging 17 as well as further treatments, such as filling or closing the plastic packagings 2—are not shown here.

FIGS. 2a to 2d show an embodiment of the cutting module 7 in various working positions. A conveyor track T, which can e.g. be a chain, is guided at two rollers 13, 13' so as to circulate endlessly. The conveyor track T here comprises gripper elements which are not shown here, such as grippers or workpiece holders, to guide the preliminary packagings 16 handed over from the blowing machine 6 to the cutting module 7 into the direction of transport 9.

A retaining block 15 is situated opposite the conveyor track T which is equipped with a support guide 14 designed as a recess. A support 11 is guided in this support guide 14 and six laser cutting units 8 are attached to the same. These are fed with coherent electromagnetic radiation by a laser 3 not shown here.

Figure 2A:
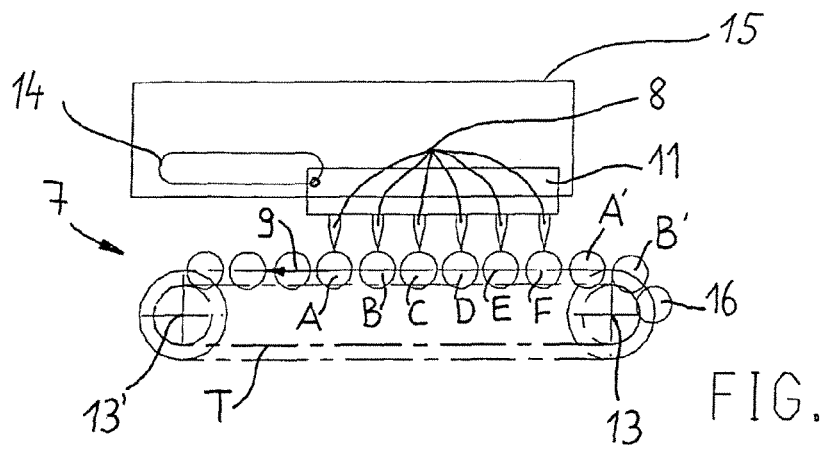
FIGS. 2a to 2d show detailed views of a cutting module in different positions.

FIG. 2a shows a position of the support I in which the distance between the laser cutting units 8 and the preliminary packagings A to F is selected such that a cutting operation can be performed. During the cutting operation, the focal point of the laser cutting units 8 is oriented such that it is in conformity with the position of the wall of the preliminary packagings A to F. One laser cutting unit 8 is associated to each preliminary packaging A to F. During the cutting operation, the preliminary packagings A to F rotate about their own longitudinal axes X.

Figure 2B:
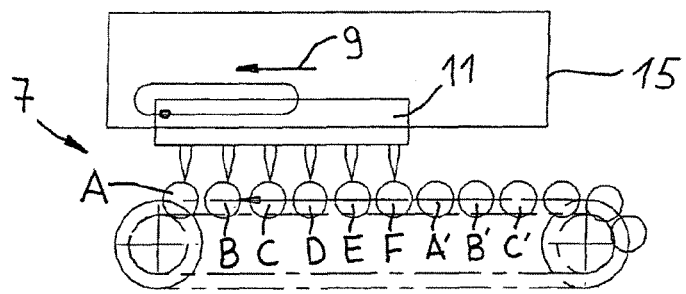

FIG. 2b shows a position in the cutting module 7 at which the cutting operation is just being completed. During the cutting operation, that means the period between the position in FIG. 2a and the position in FIG. 2b, the support 11 with the laser cutting units 8 attached thereto and the preliminary packagings A to F synchronously move into the direction of transport 9.

At the end of the cutting operation according to the position in FIG. 2b, the support 11 with the laser cutting units 8 attached thereto is traveled along the support guide 14 into the direction 10 so that a distance between the preliminary packagings A to F is formed which is no longer practicable for a cutting operation. If positions are taken by the support 11 and the laser cutting units 8 which do not permit cutting of the preliminary packagings A to F, the energy supply from the laser 3 to the laser cutting units 8 can be reduced or cut off.

Figure 2C:
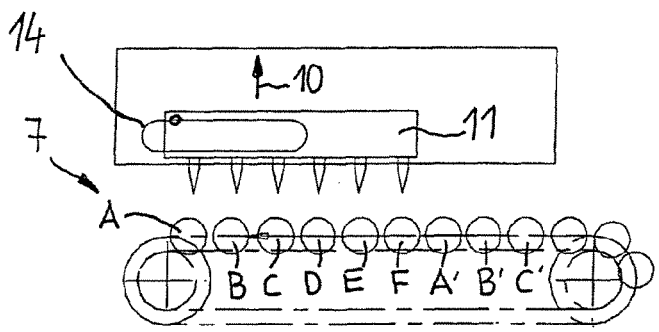
Figure 2D:
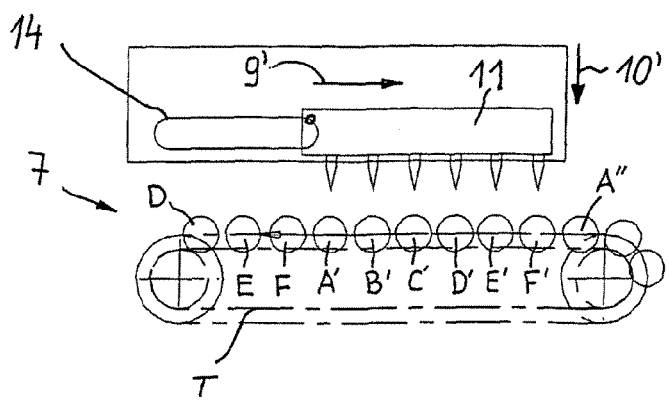

While the preliminary packagings A to F and A' to F' move further into the direction of transport 9 along the conveyor track T from a position according to FIG. 2c to a position according to FIG. 2d, the support 11 is moved along the support guide 14 into the direction 9' to the starting position of the cutting operation. When the support 11 has nearly reached its cutting position according to FIG. 2d, the meanwhile cut containers A to F have been transported further so far that now an interaction of the laser cutting units 8 with the preliminary packagings A' to F' can take place. For this, the support 11 has to be forwarded to the preliminary packagings A' to F' into the direction 10' in a last step. The preliminary packaging A" provided for the next cutting operation is already situated on the conveyor track T.

According to another embodiment of the disclosure, it is also possible that the support guide 14 does not circulate endlessly on an oval path as in the example according to FIGS. 2a to 2d, but that the support 11 is reciprocated in a linear support guide 14. In both cases it is naturally possible that the speeds of movement into the direction of transport and opposite to the direction of transport are the same or different.

Figure 3:
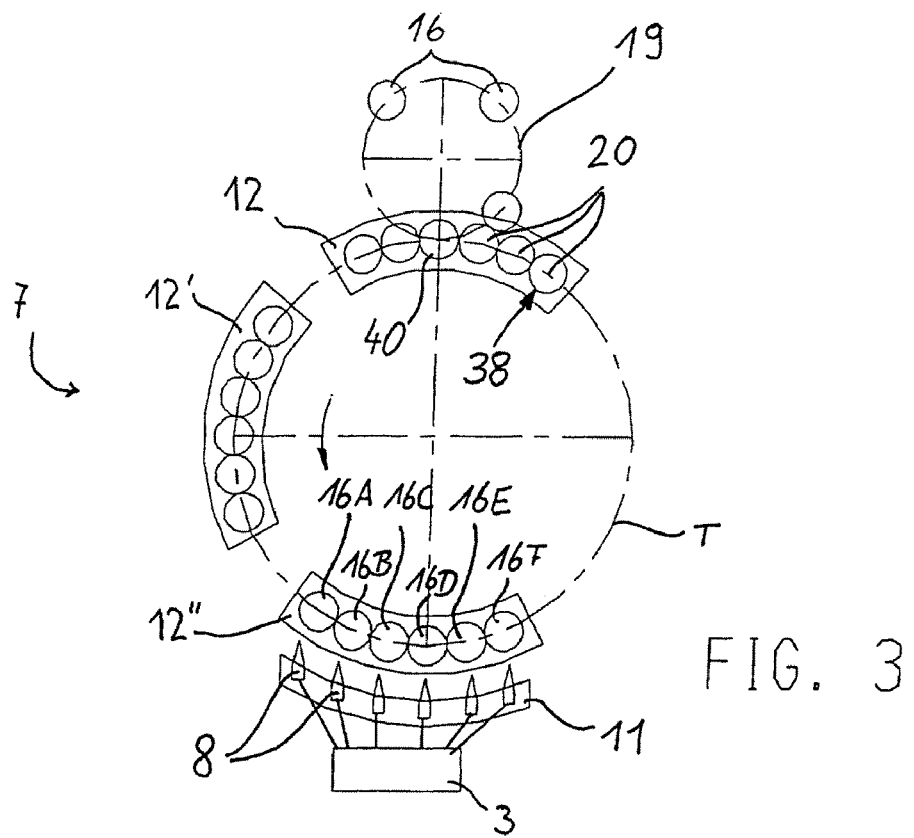
FIG. 3 shows a variant of a cutting module.

FIG. 3 shows a further embodiment of a cutting module 7. Here, the conveyor track T is arranged to be circular, group supports 12, 12' and 12" being located thereon. The group supports 12, 12' and 12" comprise recesses 20 into which the preliminary packagings 16 can be introduced. The preliminary packagings 16 are in this case handed over by the non-depicted outlet star 26 of the blowing machine 6 to the transfer star 19 of the cutting module 7, the transfer star 19 transferring the preliminary packagings 16 into the recesses 20 of the group supports 12, 12' and 12". In the following description of this embodiment, the positions are stated in degrees, where the transfer of the preliminary packagings 16 from the transfer star 19 to the group supports 12, 12', 12" is performed at position 0° and the further development of the positions take place into the anticlockwise direction. At the time of the transfer of preliminary packagings 16 to the group support 12, the same moves at a speed synchronous to the transfer star 19. After all recesses 20 of the group support 12 have been filled with preliminary packagings 16 and non-depicted mouth mandrels have been introduced into the preliminary packagings from above, the same moves into the anticlockwise direction towards the position 180° as the support 11 with the associated laser cutting units 8 and the laser 3 are situated there. The speed of the group support 12 gradually increases until position 90° has been reached, and it is then again decelerated from position 90° to position 180°, so that, when such a position is reached as the group support 12" takes in FIG. 3, the speed is zero, so that during the cutting operation between the laser cutting units 8 and the preliminary packagings 16a to 16f, there is no relative motion with respect to the conveyor track T.

After the cutting operation has been carried out, the group support 12, 12', 12" moves further into the anticlockwise direction on the conveyor track T towards position 270°, from where a removal of the plastic packaging 2 and the upper part of the packaging 18 is accomplished. The removal is accomplished by means of a transfer star designed analogously to the transfer star 19, which is not shown here in FIG. 3.

Figure 4:
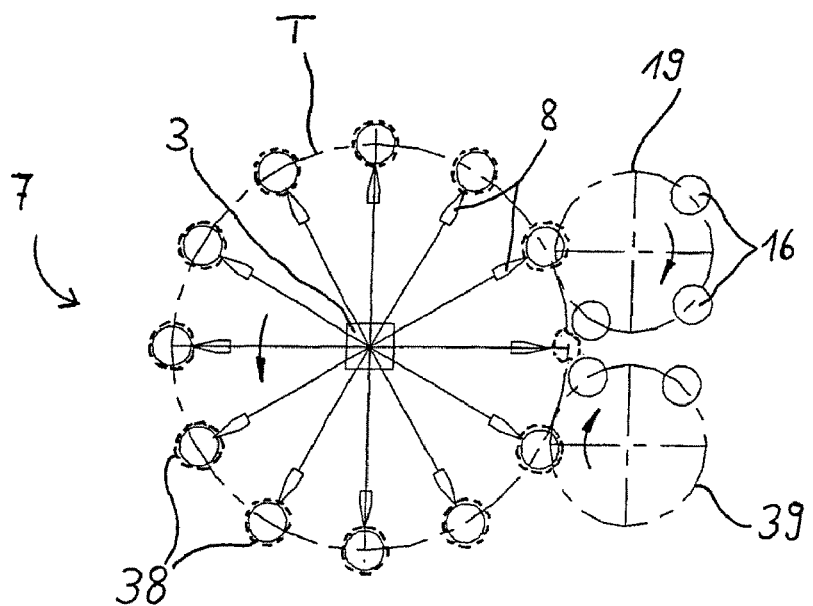
FIG. 4 shows a plan view of another variant of a cutting module.

FIG. 4 shows another alternative embodiment of a cutting module 7. The cutting module 7 comprises a transfer star 19, a circular conveyor track T as well as a discharging star 39. Twelve treatment stations 38 are on the conveyor track T, between the transfer star 19 and the discharging star 39, there are eleven treatment stations 38 each being occupied with preliminary packagings 16. The preliminary packagings 16 are handed over from the outlet star 26 of the blowing machine 6, which are not shown here, to the transfer star 19 which hands over each of them to a treatment station 38. Then mandrels are applied to the preliminary packagings 16 which center them from above, permitting clamping between the treatment stations 38 and the mandrels.

The treatment stations 38 are provided with a rotary drive, so that the preliminary packagings 16 located thereon can rotate about their own longitudinal axes X. One laser cutting unit 8 is permanently associated to each treatment station 38, the laser cutting unit carrying out the respective cutting operation between the transfer of the containers and the discharge of the containers. A laser 3 is arranged in the centre of the cutting module 7, the beam of the laser being distributed to the laser cutting units 8.

This cutting module 7 is accommodated in a non-depicted housing that is connected to an exhaust system which removes the vapors formed during the cutting operation.

Figure 5:
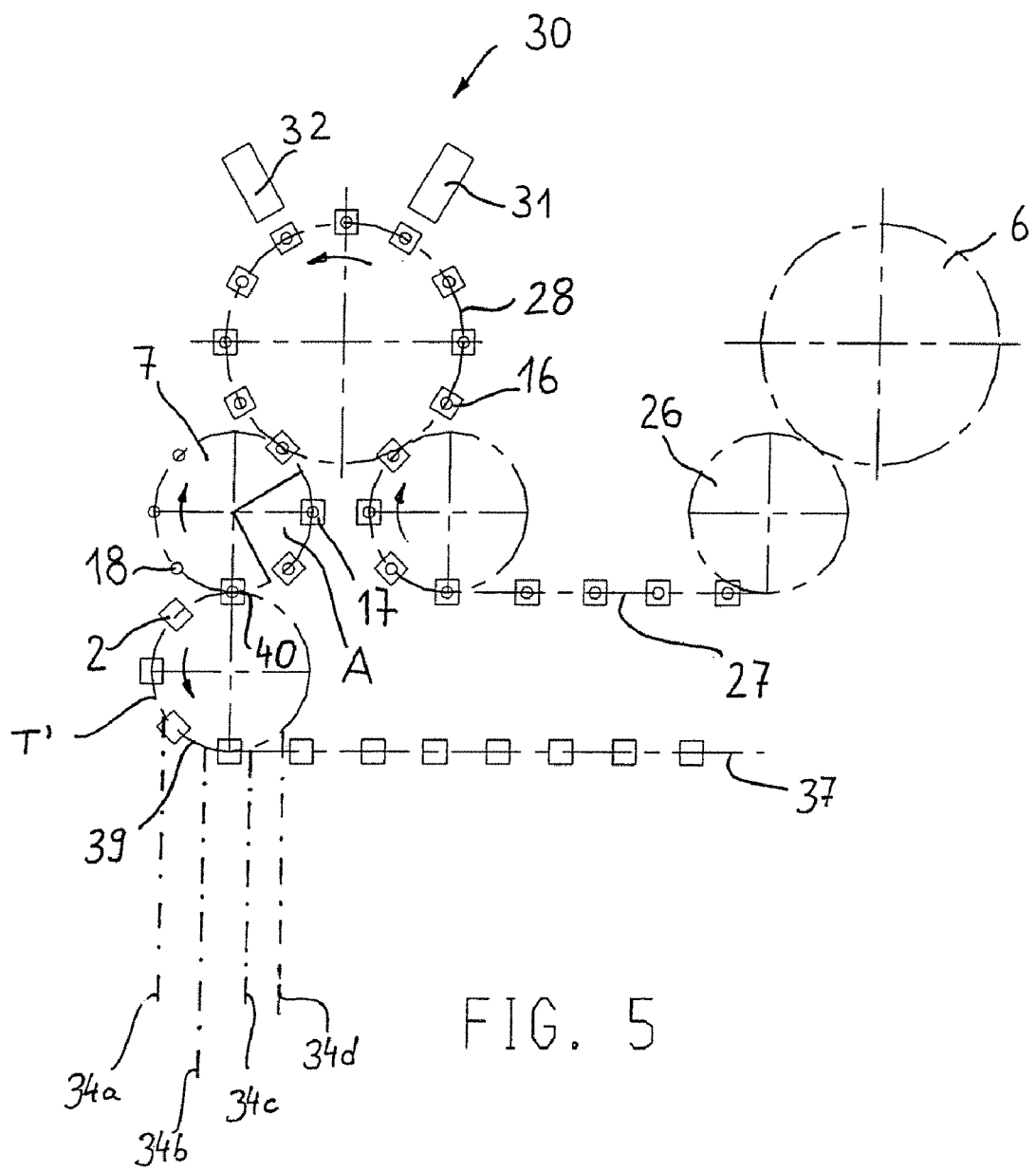
FIG. 5 shows a schematic representation of a machine arrangement with treatment unit and cutting module.

A further development of this cutting module 7 and the inclusion into a machine assembly is represented in FIG. 5. One can see a blowing machine 6 from which the finished preliminary packagings 16 are forwarded to a treatment unit 30 via the outlet star 26 and an intermediate transport stretch 27. The treatment unit 30 comprises a container table 28 as well as a labeling module 31 and a laser marking module 32. The two modules 31, 32 are attached to the periphery of the container table 28 and carry out treatment operations at the preliminary packagings 16. The preliminary packagings 16 manufactured by the blowing machine 6 are essentially rectangular shaped bottles. After the preliminary packagings 16 have been labeled and marked by the laser, they are handed over from the treatment unit 30 to the cutting module 7. A clamp holds the mouth of the preliminary packaging 16. In the cutting module 7, they are cut in segment A, so that two-part packagings 17 are formed, the upper parts of the packagings 18 being held by non-depicted clamps and the plastic packagings 2 being situated on treatment stations 38. In a transfer station 40, the two-part packaging 17 is separated into a plastic packaging 2 and an upper part of the packaging 18. The upper part of the packaging 18 is further transported in the cutting module 7 and discarded at a discharging station not shown here. The finished plastic packagings 2 are in contrast handed over to the discharging star 39 and driven out of the machine arrangement, e.g. standing on a conveying belt 37. Further treatment of the plastic packagings 2 can include e.g. filling with liquid goods or preferably with solid objects, such as e.g. pralines, biscuits or other pastries. Moreover, a neither depicted closing element advantageously follows. It is furthermore possible for the plastic packagings 2 to be handed over by the discharging star 39 to various conveyor tracks 34a, 34b, 34c, 34d. For this, the discharging star 39 is preferably designed as servo distribution star of which the non-depicted grapplers can be individually controlled and which thus performs a distribution to the tracks.

The treatment unit 30 can be situated, as shown in FIG. 5, between the blowing machine 6 and the cutting module 7, or else be mounted only after the cutting module 7.

FIG. 6 shows an exemplary preliminary packaging 16 as it can be manufactured in an above-described method. Here, the preliminary packaging 16 is divided into a body region and a mouth region, the body region forming the later plastic packaging 2, and the mouth region forming the upper part of the packaging 18. The plastic packaging 2 to be manufactured here is a shaped bottle with a noncircular cross-section as can be seen in FIG. 6a in the plan view of the preliminary packaging 16. FIG. 6b shows an already cut two-part packaging 17.

If such shaped containers are treated in a cutting module 7 according to the disclosure, it becomes quickly clear that with a rotation of the preliminary packaging about its own axis X in a cutting module 7 with permanently associated laser cutting units 8, various distance situations between the circumference of the preliminary packaging 16 and the laser cutting unit 8 occur, depending on the rotational position of the preliminary packaging 16. In such cases, it is necessary that either the distance between the laser cutting unit 8 and the preliminary packaging 16 or the focal point of the laser cutting units 8 can be changed. Only in this way it is guaranteed that the focal point of the laser cutting unit 8 is situated exactly at the edge of the circumference upon the rotation of the preliminary packaging 16 about its own longitudinal axis X.

Figure 7:
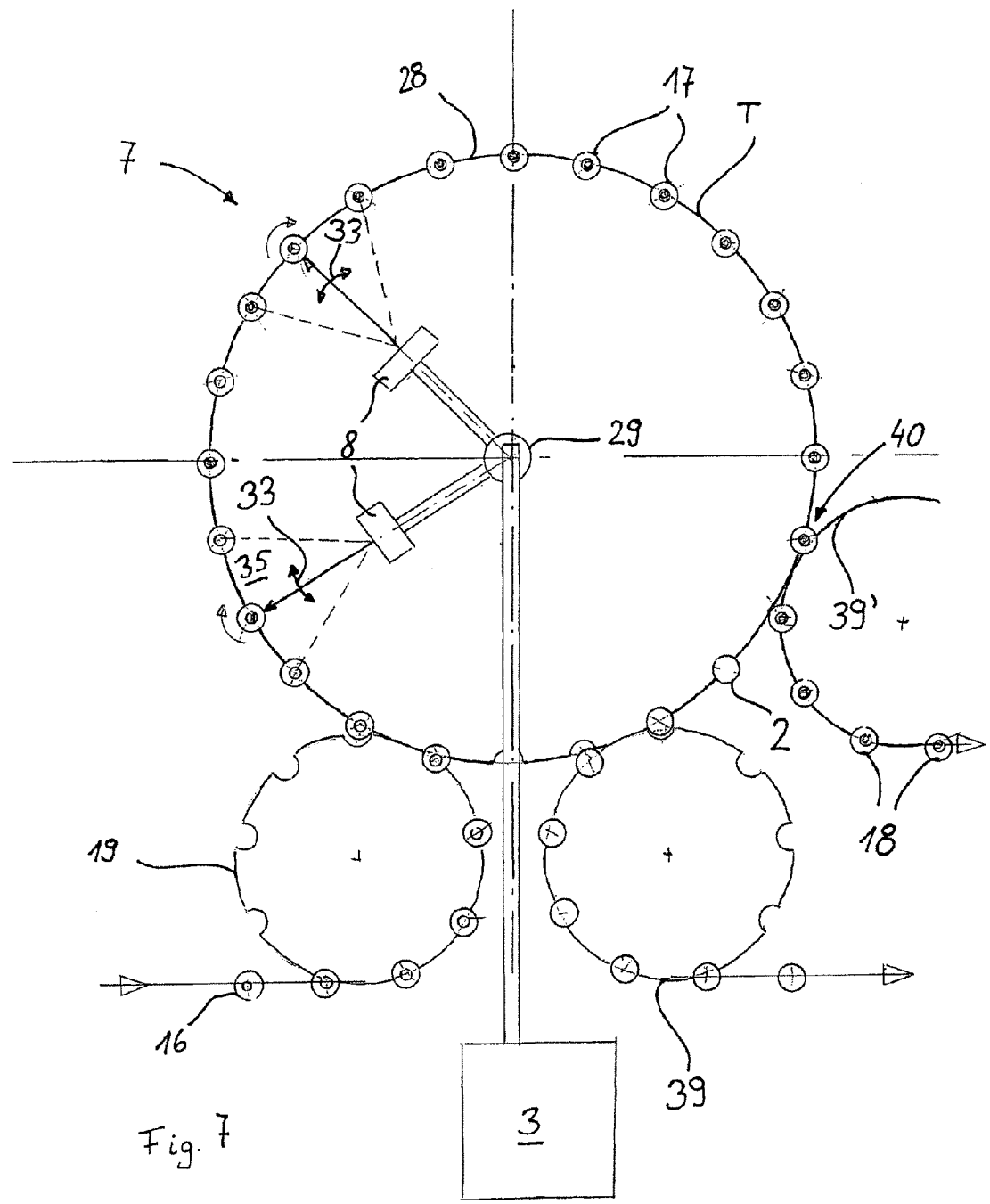
FIG. 7 shows a plan view of a preferred cutting module arrangement.

FIG. 7 shows a particularly preferred embodiment of the disclosure showing a transfer star 19, a cutting module 7 with a container table 28 as well as two discharging stars 39' for the upper parts of the packagings 18 and 39 for the plastic packagings 2. The preliminary packagings 16 are here transferred to the container table 28 of the cutting module 7 by means of a transfer star 19. The container table 28 comprises recesses or container retainers arranged equidistantly, such as e.g. dial feeds, at or on which the containers can be transported. Moreover, the device 1 comprises a laser 3 as well as two laser cutting units 8. The laser beam is directed by the laser 3 over the container table 28 to the distribution node 29 attached centrally above the container table 28, where it is split up to two partial laser beams and guided to the two laser cutting units 8. The laser cutting units 8 are here formed each by one laser scanner, i.e. a laser mirror arrangement with at least one mirror each which is able to deflect the laser beam by the movement of the mirror into the direction 33 in a predetermined segment 35. During the cutting operation, the preliminary packagings 16 additionally rotate about their own axes, so that in a segment 35, which the laser beam can enter, a preliminary packaging 16 is cut all around. The movement of the mirror into the direction 33 and the movement of the container table 28 can be adjusted to each other such that a relative standstill between the laser beam and the preliminary packaging 16 can be generated during cutting. The laser cutting units 8 are here arranged eccentrically of the container table 28 to provide a low distance (5 cm to 30 cm) to the preliminary packagings 16 to be cut. However, it is also possible to attach the laser cutting units 8 in the center in the region of the distribution node 29. The laser cutting units 8 are arranged such that every second preliminary packaging 16 is cut. A laser cutting unit 8 thus only cuts e.g. the even-numbered preliminary packagings 16 on the container table 28, while the other laser cutting unit 8 only cuts the odd-numbered preliminary packagings 16. Cutting is accomplished approximately simultaneously, where simultaneously does not mean that both cutting operations necessarily begin simultaneously and end simultaneously. Simultaneously also means that the two cutting operations at least overlap chronologically. In this manner an efficient cutting method is provided. After cutting, the containers are passed by a transfer station 40 where the upper parts of the packaging 18 are removed and discharged from a discharging star 39' while the plastic packagings 2 are guided out of the system by means of a transfer star 39. However, it is also possible to provide more than two laser cutting units 8, so that by the variation of the number of units 8, different scopes of performance of the machines can be provided. As further embodiment it is possible to provide at least one treatment unit 30, such as a labeling machine, in front of the cutting module 7 or in front of the laser cutting units 8.

We claim:

1. Method for the manufacture of a plurality of plastic packagings, comprising: providing a heated preform, shaping a preform to a preliminary packaging, removing an upper part of the packaging of this preliminary packaging in a cutting module wherein in removing the upper part of the packaging of the preliminary packaging at least one laser cutting unit performs a cutting operation on the preliminary packaging, and wherein several of the preliminary packagings are simultaneously and respectively treated with one laser cutting unit each, and moving the preliminary packagings as well as the laser cutting units on an essentially circular conveyor track during the cutting operation, wherein the laser cutting units stand still while laser beams move along the conveyor track such that a relative stand still between the laser beam and the preliminary packaging is generated during cutting, and splitting up a laser beam by a centrally arranged distributions node to the various laser cutting units during cutting.

2. Method according to claim 1, and rotating the preliminary packagings about their longitudinal axes during the cutting operation.

3. Method according to claim 1, and wherein the number of laser cutting units is smaller than or equal to the number of preliminary packagings situated on the circular conveyor track.

4. Method according to claim 1, and moving the preliminary packagings uniformly along the circular conveyor track.

5. Method according to claim 1, wherein the preliminary packagings are combined to groups which together move along the circular conveyor track, the speed of the groups depending on their positions on the conveyor track.

6. Method according to claim 5, wherein the speed of the groups along the conveyor track is zero at the time of the cutting operation.

7. Method according to claim 5, and wherein the velocity profile of the groups along the conveyor track from the transfer of the preliminary packagings to the cutting module to the position at which the cutting operation is carried out first shows an increasing course to a maximum speed that is higher than the speed at the transfer of the preliminary packagings, and then a decreasing course until a standstill during the cutting operation.

8. Method according to claim 7, and wherein the velocity profile of the groups along the conveyor track from the position at which the cutting operation is carried out to the discharge of the plastic packagings first shows an increasing course to a maximum speed and then a decreasing course to a discharge speed approximately corresponding to the transfer speed.

9. Method according to claim 1, wherein chronologically before the removal of the upper part of the packaging, a treatment operation takes place.

10. Method according to claim 1, wherein during the cutting operation, a change of the focal length of the laser cutting units is accomplished.

11. Method according to claim 1, further comprising during the cutting operation changing the distance from a laser cutting unit to the associated preliminary packagings.

12. Method according to claim 1, wherein the preliminary packagings are situated on treatment stations at least in the cutting module which hold them in the region of a bottom and are held by grippers in the region of the upper part of the packaging, where the conveyor track of the cut plastic containers at least partially differs from the conveyor track of the upper parts of the packaging after the cutting operation.

13. Method according to claim 1, and placing the plastic containers onto various conveyor tracks after the upper parts of the packagings have been separated.

14. Method according to claim 9, wherein the treatment operation comprises one of labeling, marking, cleaning, and combinations thereof.

15. Method according to claim 9, wherein the treatment operation comprises one of labeling, marking, cleaning, and combinations thereof.

16. Method according to claim 1, wherein no relative motion between the laser cutting units and the preliminary packagings with respect to the direction of transport takes place at least during the cutting operation.

17. Device for the manufacture of plastic packagings, comprising a heater for preforms, a blowing machine for the manufacture of a preliminary packaging, and a cutting module comprising a laser cutting module with at least two laser cutting units mounted on a rotary container table wherein a laser is provided, of which the laser beam can be split up to the various laser cutting units by a centrally arranged distributions node such that a relative stand still between the laser beam and the preliminary packaging can be generated during cutting, and wherein the laser cutting units are attached radially between the distribution node and the preliminary packagings to be cut.

18. Device according to claim 17, and a treatment unit associated with the processing path between the blowing machine and the cutting module.

19. Device according to claim 18, wherein the treatment unit comprises one of a labeling module, a marking module, a cleaning module, and a combination thereof.

20. Device according to claim 17, wherein the preliminary packagings are arranged in groups, the number of preliminary packagings in one group being equal to the number of laser cutting units in the cutting module.

21. Device according to claim 18, wherein there are at least two groups spaced apart from one another, wherein a number of laser cutting units is associated to each of the groups, the number of laser cutting units corresponding to the number of preliminary packagings per group.

22. Device according to claim 17, wherein the number of laser cutting units is equal to the number of treatment stations in the cutting module.

23. Device according to claim 22, wherein the laser cutting units are formed by laser scanners.

24. Device according to claim 17, wherein the laser is a CO2 laser.

25. Device according to claim 17, wherein the cutting module is equipped with grippers that can hold the preliminary packagings.

26. Device according to claim 25, wherein the grippers comprise one of bottom grippers, body grippers, neck grippers, and combinations thereof.

27. Device according to claim 25, wherein the cutting module comprises a chain for transporting the preliminary packagings.

28. Device according to claim 17, wherein the cutting module comprises treatment stations, each treatment station being provided with a rotary drive.

29. Device according to claim 28, wherein the rotary drives are formed by one of servomotors, stepper motors, or combinations thereof.

30. Device according to claim 17, and an exhaust system which sucks off gases formed during laser cutting.

31. Device according to claim 17, and a discharging star designed as distribution star that can discharge the plastic packagings at various places.

32. Device according to claim 17, and a treatment unit with respect to the processing path between the blowing machine and the cutting module.

33. Device according to claim 32, wherein the treatment unit comprises one of a labeling module, a marking module, a cleaning module, and combinations thereof.

34. Device according to claim 23, wherein the laser scanners can deflect the laser beams by means of mirrors.

35. Device according to claim 17, wherein the laser cutting units are fixed to a common support.

36. Device according to claim 17, wherein the support can be moved at least partially along the conveyor track of the preliminary packagings.

* * * * *